(12) United States Patent  
Wang

(10) Patent No.: US 10,777,874 B2  
(45) Date of Patent: Sep. 15, 2020

(54) INSTALLING UNIT, BRACKET, INSTALLING ASSEMBLY OF AN ANTENNA, AND AN INSTALLING METHOD

(71) Applicant: Nokia Shanghai Bell Co., Ltd., Shanghai (CN)

(72) Inventor: Junkai Wang, Shanghai (CN)

(73) Assignee: Nokia Shanghai Bell Co., Ltd., Shanghai (CN)

(*) Notice: Subject to any disclaimer, the term of this patent is extended or adjusted under 35 U.S.C. 154(b) by 85 days.

(21) Appl. No.: 15/775,613

(22) PCT Filed: Nov. 4, 2016

(86) PCT No.: PCT/CN2016/104762  
§ 371 (c)(1),  
(2) Date: May 11, 2018

(87) PCT Pub. No.: WO2017/080412  
PCT Pub. Date: May 18, 2017

(65) Prior Publication Data  
US 2018/0342786 A1 Nov. 29, 2018

(30) Foreign Application Priority Data

Nov. 13, 2015 (CN) .......................... 2015 1 0779868

(51) Int. Cl.  
H01Q 1/12 (2006.01)  
H01Q 1/22 (2006.01)  
(Continued)

(52) U.S. Cl.  
CPC ................ H01Q 1/22 (2013.01); H01Q 1/12 (2013.01); H01Q 1/1221 (2013.01); H01Q 1/20 (2013.01);  
(Continued)

(58) Field of Classification Search  
CPC ........ F16B 5/02; H01Q 19/10; H01Q 19/106; H01Q 1/12; H01Q 1/1221; H01Q 1/20;  
(Continued)

(56) References Cited

U.S. PATENT DOCUMENTS 2,266,532 A * 12/1941 Braunschweig ......... H04B 1/03  
439/32  
3,560,981 A * 2/1971 Pestka .................... H01Q 1/084  
343/702

(Continued)

FOREIGN PATENT DOCUMENTS

CN 201985238 U 9/2011  
CN 103904437 A 7/2014  
(Continued)

OTHER PUBLICATIONS

English Bibliography of Japanese Patent Application Publication No. JP7025317U, Published May 12, 1995, Printed from Derwent Innovation on Jul. 8, 2019, 3 pages.

(Continued)

Primary Examiner — Tho G Phan  
(74) Attorney, Agent, or Firm — Fay Sharpe LLP

(57) ABSTRACT

An installing unit, installing assembly of an antenna and an installing method are provided. An installing unit according to the invention is provided, wherein the installing unit comprises a cylindrical structure including an inner cylindrical wall, which has a first clip structure for connecting a first other part between said inner cylindrical wall and said outer cylindrical wall, and said outer cylindrical wall has a second clip structure thereon for connecting said installing unit to a second other part, and said installing unit can be connected to a third other part via rigid connection. Simultaneous blind insertion of multiple connectors in a closed frame, especially in a closed frame with a large area, can be realized, which improves the reliability of the active large- (Continued)

scale MIMO antenna and the efficiency of the installing process, reduce manpower as used, and increase the pass rate of installing.

12 Claims, 6 Drawing Sheets

(51) Int. Cl.
  *H01Q 19/10*    (2006.01)
  *H01Q 1/24*     (2006.01)
  *H01Q 1/20*     (2006.01)
  *F16B 5/02*     (2006.01)

(52) U.S. Cl.
  CPC .......... *H01Q 1/246* (2013.01); *H01Q 19/106* (2013.01); *F16B 5/02* (2013.01); *H01R 2201/02* (2013.01)

(58) Field of Classification Search
  CPC . H01Q 1/22; H01Q 1/24; H01Q 1/246; H01R 2201/02
  See application file for complete search history.

(56) References Cited

U.S. PATENT DOCUMENTS

| | | | | |
|---|---|---|---|---|
| 3,778,537 | A * | 12/1973 | Miller | H01Q 1/1228 174/138 R |
| 6,126,128 | A | 10/2000 | Costa et al. | |
| 6,364,511 | B1 * | 4/2002 | Cohen | F21S 8/02 362/148 |
| 8,864,432 | B2 | 10/2014 | Figge et al. | |
| 2007/0210978 | A1 * | 9/2007 | Zihlman | H01Q 1/125 343/892 |
| 2012/0027056 | A1 | 2/2012 | Shinkai | |
| 2013/0088402 | A1 | 4/2013 | Lindmark et al. | |

FOREIGN PATENT DOCUMENTS

| | | |
|---|---|---|
| CN | 204029979 U | 12/2014 |
| CN | 104836012 A | 8/2015 |
| CN | 205303657 U | 6/2016 |
| JP | H0725317 U | 5/1995 |
| JP | 200049517 A | 2/2000 |
| JP | 2012519990 A | 8/2012 |
| KR | 20100006380 U | 6/2010 |

OTHER PUBLICATIONS

Extended European Search Report for Patent Application No. 16863588.6-1205; dated Jun. 12, 2019, 10 pages.
English Bibliography for Japanese Patent Application No. 200049517A, published on Feb. 18, 2000, printed from Derwent Innovation on Apr. 3, 2019, 4 pages.
English Bibliography for Korean Patent Application No. 201006380U, published on Jun. 24, 2010, printed from Derwent Innovation on Apr. 3, 2019, 4 pages.
PCT Patent Application No. PCT/CN2016/104762, Written Opinion of the International Searching Authority, dated Jan. 23, 2017, 8 pages.
International search Report for PCT/CN2016/104762 dated Jan. 23, 2017.
English Bibliography of Japanese Patent Application No. JP2012519990A, published on Aug. 30, 2012, printed from Derwent Innovations on Apr. 27, 2020, 4 pages.

* cited by examiner

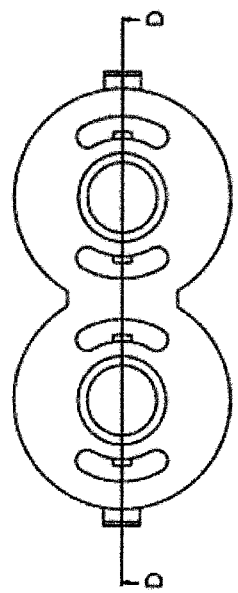
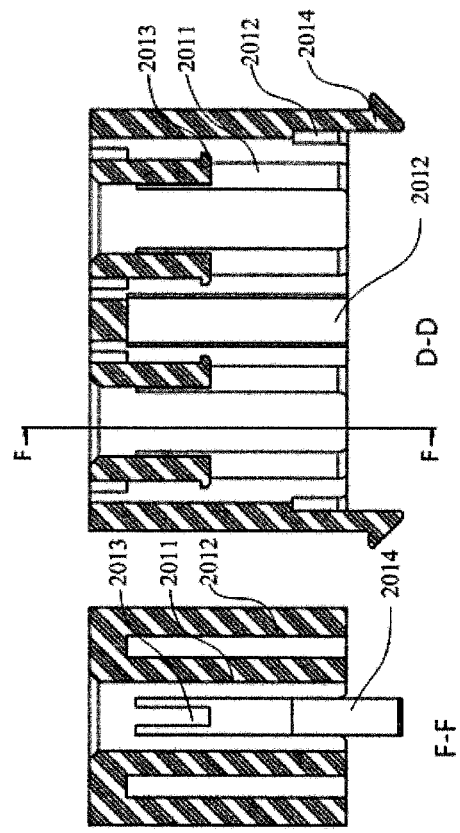
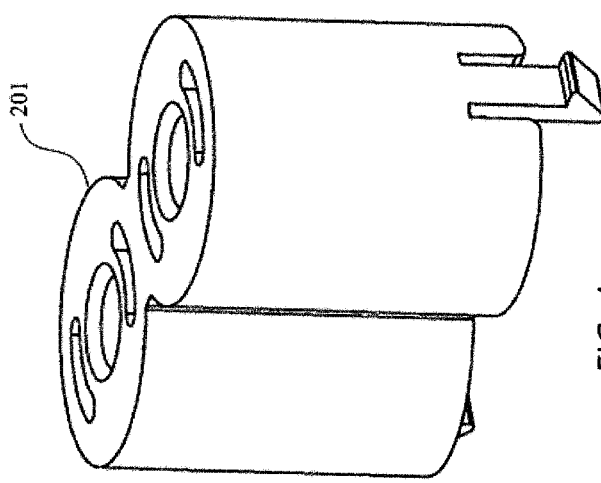

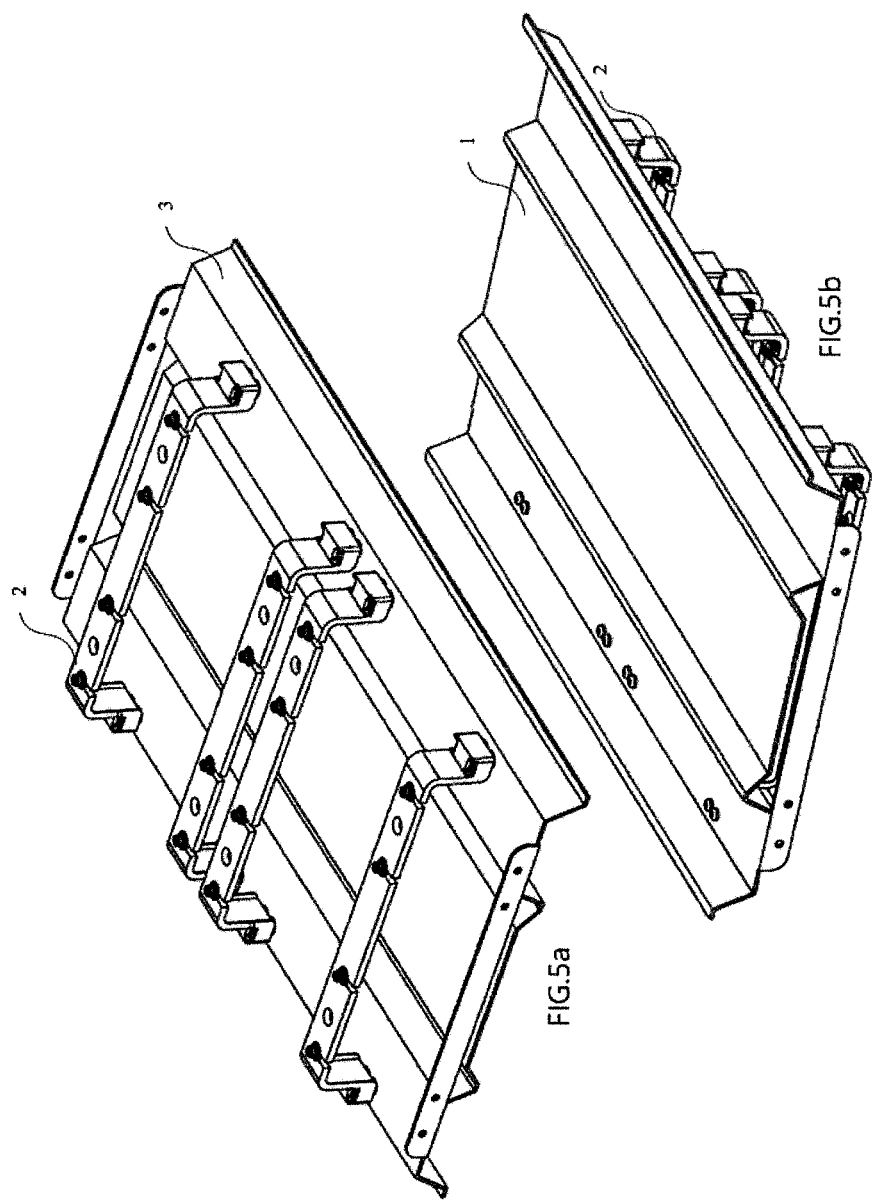

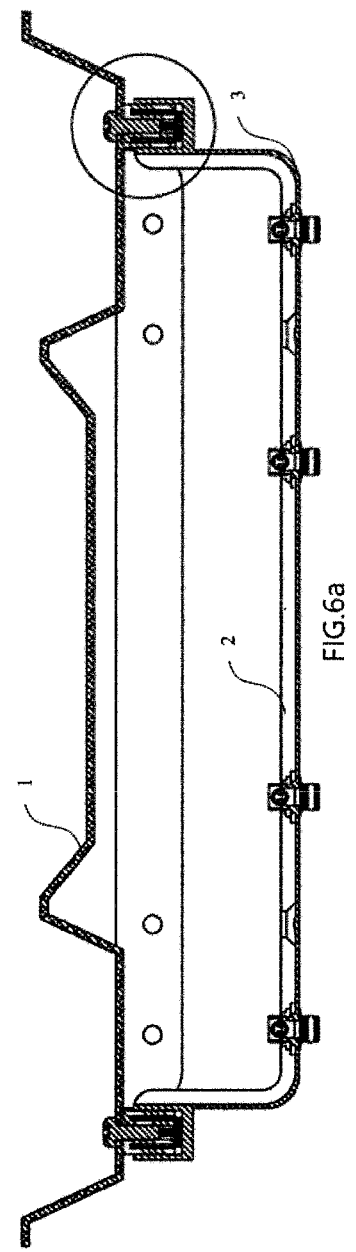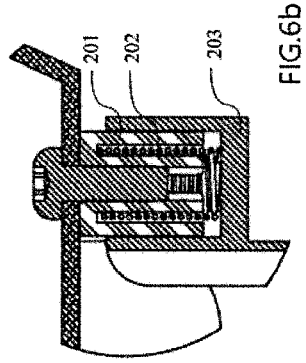

INSTALLING UNIT, BRACKET, INSTALLING ASSEMBLY OF AN ANTENNA, AND AN INSTALLING METHOD

TECHNICAL FIELD

The present disclosure relates to the field of communications technologies, and in particular, to an installing unit, a bracket, an installing assembly, and an installing method thereof.

BACKGROUND

For new type active Massive multi-input multi-output (MIMO) antenna, one important feature is the product will have numerous connectors need to realize blind and simultaneous insertion. For AAA1800 product, the product applies at least 16 pieces of coaxial connectors to accomplish connection between antenna reflector assembly and a closed big area frame. Therefore, how to deal with this challenge become much important for the product.

Besides, being affected by the size of distributed feedback network (CFN) and wireless printed circuit board (PCB), it is becoming much more difficult to accomplish accurate insertion for at least 4 pieces of coaxial connectors in a big area. For an AAA product, the area is around 0.49 square meter, being 1.4 m long and 0.35 m wide.

Another challenge the technical need to solve is how to realize all of the coaxial connectors can reach out of the holes on the big area frame, the coaxial connector as chosen is a new type but already wildly applied connector on telecommunication equipment. If requesting the big area frame with a certain thickness, then another question is how to ensure the connector can fully reach out to the holes. Since once a bracket can't make the connectors on it reach out of the hole smoothly, it will definitely affect other brackets, and it is very important for an operator being able to adjust the bracket by hand or tool in a closed big area frame.

SUMMARY OF INVENTION

It is an object of the present disclosure to provide an installing unit, a bracket, an installing assembly of an antenna, and an installing method.

According to one aspect of the present disclosure, there is provided an installing assembly (2) of an antenna, wherein said installing unit (201) comprises a cylindrical structure including an inner cylindrical wall (2011) and an outer cylindrical wall (2012), said cylindrical wall (2011) has a first clip structure (2013) for connecting a first other part between said inner cylindrical wall (2011) and said outer cylindrical wall (2012), and said outer cylindrical wall (2012) has a second clip feature (2014) thereon for connecting said installing unit (201) to a second other part, and said installing unit (201) can be connected to a third other part via rigid connection.

According to one aspect of the present disclosure, there is provided an installing assembly (2) of an antenna, wherein said installing assembly comprises said installing unit (201), an elastic middle part (202) and a bracket (203) with a concave structure at both ends thereof, said installing unit (201) is connected to said elastic middle part (202) between the inner cylindrical wall (2011) and the outer wall (2012) via a first clip structure (2013); and said installing unit (201) is connected to the inner wall of the concave structure of said bracket (203) via a second clip structure (2014) on the outer wall (2012) thereof, the bottom of said elastic middle part (202) is in contact with the bottom of the concave structure of said bracket (203), so that said installing unit (201) is connected to the reflector (1) of said antenna via rigid connection, and after placing said reflector (1) and said installing assembly (2) in the closed frame (3), said bracket (203) can be attached to said frame (3) by means of the elastic force of said elastic middle part (202).

According to an aspect of the present disclosure, there is provided an installing method of an antenna, wherein the installing assembly of the antenna is as claimed as above, wherein said installing method comprises the following steps:

m connecting the installing unit (201) with the elastic middle part (202) by using the first clip structure (2013) of the installing unit (201);

n connecting said installing unit (201) with the bracket (203) by using the second clip structure (2014) of said installing unit (201); wherein the bottom of said elastic middle part (202) is in contact with the bottom of the concave structure of said bracket (203).

wherein said installing method further includes the following steps:

x attaching said installing unit (201) to the reflector (1) of the antenna.

Compared with the prior art, the present disclosure has the following advantages: according to the embodiments of the present disclosure, simultaneous blind insertion of multiple connectors in a closed frame, especially in a closed frame with a large area can be realized, which improves the reliability of the active large-scale MIMO antenna and the efficiency of the installing process, reduce manpower as used, and increase the pass rate of installing. It can be easily adjusted by hand or by a tool due to the use of an elastic structure, and it can be easily reworked since the installing assembly is easily disassembled, and, furthermore, the thickness and the weight of the antenna thickness can be reduced.

BRIEF DESCRIPTION OF DRAWINGS

Other features, objects, and advantages of the present disclosure will become more apparent by reading the following detailed description of non-limiting embodiments with reference to the following drawings:

FIG. 3a illustrates a top view of an installing assembly according to one embodiment of the present disclosure;

FIG. 3b illustrates a side view of an installing assembly according to one embodiment of the present disclosure;

FIG. 3c illustrates a bottom view of the installing assembly according to one embodiment of the present disclosure;

FIG. 4a illustrates a three-dimensional structural view of an installing unit according to one embodiment of the present disclosure;

FIG. 4b illustrates a top view of an installing unit according to one embodiment of the present disclosure;

FIG. 4c illustrates a cross-sectional view of the installing unit according to one embodiment of the present disclosure taken along line D-D of the top view shown in FIG. 4b;

FIG. 4*d* illustrates a cross-sectional view of the installing unit according to one embodiment of the present disclosure taken along line F-F of the sectional view shown in FIG. 4*c;*

FIG. 5*a* illustrates a schematic diagram of the back of the frame after the antenna is installed according to an embodiment of the present disclosure;

FIG. 5*b* illustrates a schematic diagram of a reflector after antenna installing is completed according to one embodiment of the present disclosure;

FIG. 6*a* illustrates a cross-sectional view of an antenna employing an installing assembly of the present disclosure taken along the axis of a bracket according to one embodiment of the present disclosure;

FIG. 6*b* illustrates an enlarged view of the circled portion of FIG. 6*a.*

Figure 1:
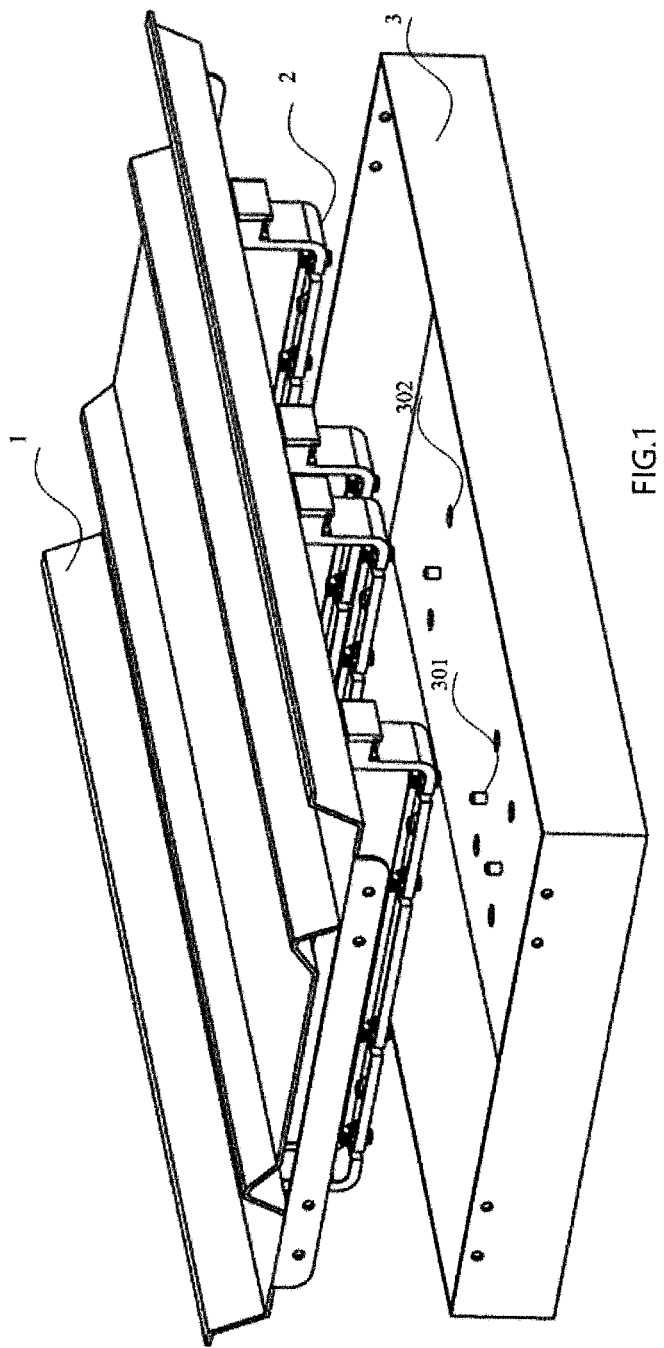
FIG. 1 illustrates a three-dimensional structural diagram of an antenna according to an embodiment of the present disclosure.

In the above drawings, the reference numerals used are as follows:

| 1 | reflector | 2 | installing assembly |
|---|---|---|---|
| 3 | frame | 201 | installing unit |
| 202 | elastic middle part | 203 | bracket |
| 2011 | inner cylindrical wall | 2012 | outer cylindrical wall |
| 2013 | the first clip structure | 2014 | the second clip structure |
| 2031 | locating structure | 2032 | connector hole |
| 2033 | the third clip structure | 301 | locating pin |
| 302 | connector installing hole | | |

DETAILED DESCRIPTION

The present disclosure will be further described in detail below with reference to the accompanying drawings.

Referring to FIG. 1, It illustrates a three-dimensional structural diagram of an antenna according to an embodiment of the present disclosure.

The antenna according to FIG. 1 comprises a reflector (1), a plurality of installing assemblies (2), and a closed frame (3).

Particularly, the closed frame (3) includes a plurality of locating pins (301) and a plurality of connector installing holes (302), for guiding the locating of the bracket (203) in the installing assembly (2).

Figure 2:
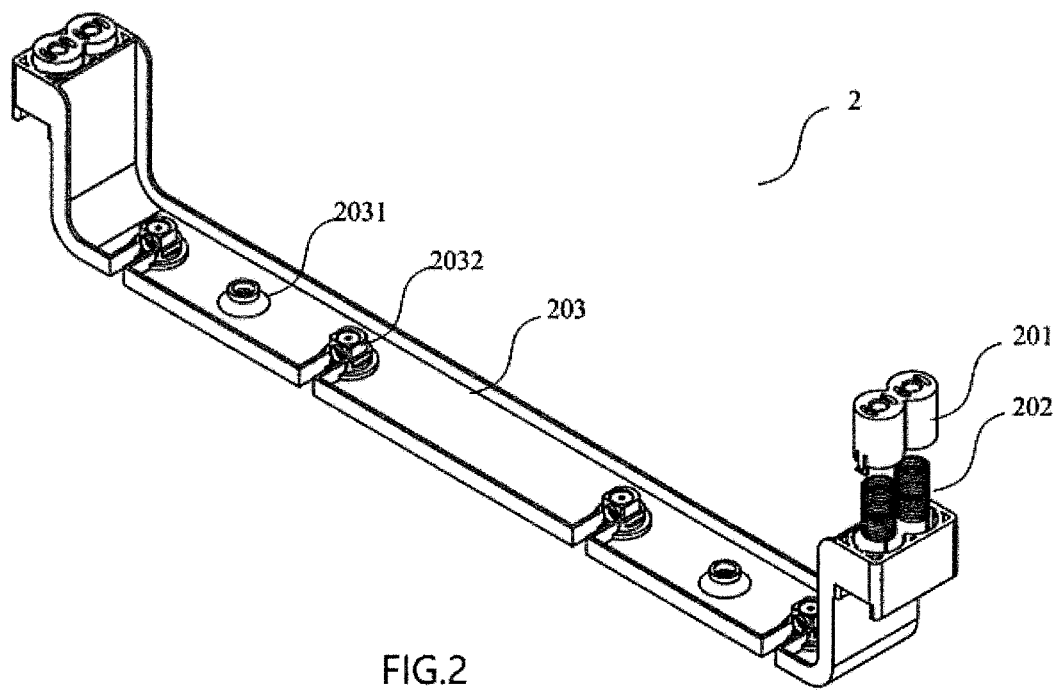
FIG. 2 illustrates a three-dimensional structural view of an installing assembly according to an embodiment of the present disclosure.

Next, reference is made to FIG. 2 and FIG. 3*a* to FIG. 3*c,* in which FIG. 2 illustrates a three-dimensional structural view of an installing assembly according to an embodiment of the present disclosure, FIG. 3*a* illustrates a top view of the installing assembly of according to one embodiment of the present disclosure, FIG. 3*b* illustrates a side view of the installing assembly according to one embodiment of the present disclosure, and FIG. 3*c* illustrates a bottom view of an installing assembly according to one embodiment of the present disclosure.

Particularly, each installing assembly (2) includes an installing unit (201), an elastic middle part (202) and a bracket (203) having a concave structure.

Particularly, the bracket (203) have a concave structure at both ends for matching the outer profile of the installing unit (201).

Preferably, the bracket (203) includes a locating structure (2031) for matching with a locating pin (301) on the frame (3), and a connector hole (2032) for the connector.

Particularly, the installing unit (201) according to the present disclosure includes a cylindrical structure, the cylindrical structure comprises an inner cylindrical wall (2011) and an outer cylindrical wall (2012). The inner cylindrical wall (2011) has a first clip structure (2013) for connecting a first other part between the inner cylindrical wall (2011) and the outer cylindrical wall (2012), and the outer cylindrical wall (2012) has a second clip feature (2014) thereon for connecting the installing unit (201) to a second other part. And the installing unit (201) can be connected to a third other part via rigid connection.

Preferably, the inner cylindrical wall (2011) of the installing unit (201) according to the invention has a threaded structure therein, the installing unit (201) being connected to said third other part via a threaded fastener.

Particularly, the first other part includes but not limited to a elastic middle part (202); the second other part includes but is not limited to a bracket (203), and the third other part includes but is not limited to a reflector (1).

Preferably, the installing unit (201) according to the present disclosure may include one or more cylindrical structures.

More preferably, if the installing unit (201) comprises a plurality of cylindrical structures, an outer cylindrical wall (2012) may be shared among the plurality of adjacent cylindrical structures.

In the installing assembly according to the present disclosure, the installing unit (201) is connected to the elastic middle part (202) between the inner cylindrical wall (2011) and the outer cylindrical wall (2012) via a first clip structure (2013); and the installing unit (201) is connected to the inner wall of the concave structure of the bracket (203) via a second clip structure (2014) on the outer cylindrical wall (2012) thereof. The bottom of the elastic middle part (202) is in contact with the bottom of the concave structure of the bracket (203), so that the installing unit (201) is connected to the reflector (1) of the antenna via rigid connection, and after placing the reflector (1) and the installing assembly (2) into the closed frame (3), said bracket (203) can be attached to the frame (3) by means of the elastic force of said elastic middle part (202).

Particularly, the elastic middle part (202) according to the present disclosure is a cylindrical structure.

Preferably, the elastic middle part (202) according to the present disclosure is a spring.

Preferably, if the installing unit (201) includes a plurality of cylindrical structures, the installing assembly includes a plurality of elastic middle part (202), and the installing unit (201) is connected to said elastic middle part (202), via a first clip structure (2013) on each inner cylindrical wall (2011) of each respective cylindrical structures, between each of said inner cylindrical wall (2011) and said outer cylindrical wall (2012).

Figure 3D:
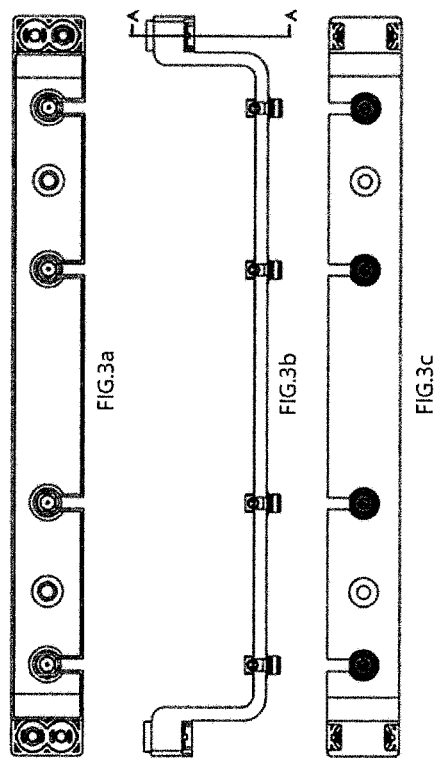
FIG. 3d illustrates a sectional view of the installing assembly according to an embodiment of the present disclosure along line F-F in the side view shown in FIG. 3b.

According to an embodiment of the present disclosure, reference is made to FIG. 3*d* and FIG. 4, in which FIG. 3*d* illustrates a cross-sectional view of the installing assembly according to an embodiment of the present disclosure taken along line F-F in the side view shown in FIG. 3*b*, FIG. 4*a* illustrates a three-dimensional structure diagram of an installing unit according to an embodiment of the present disclosure, FIG. 4*b* illustrates a top view of an installing unit according to an embodiment of the present disclosure, FIG. 4*c* illustrates a cross-sectional view of the installing unit according to one embodiment of the present disclosure taken along line D-D in the top view of FIG. 4*b*, and FIG. 4*d* illustrates a cross-sectional view of the installing unit according to one embodiment of the present disclosure taken along line F-F in the cross-sectional view of FIG. 4*c.*

Figure 3D:
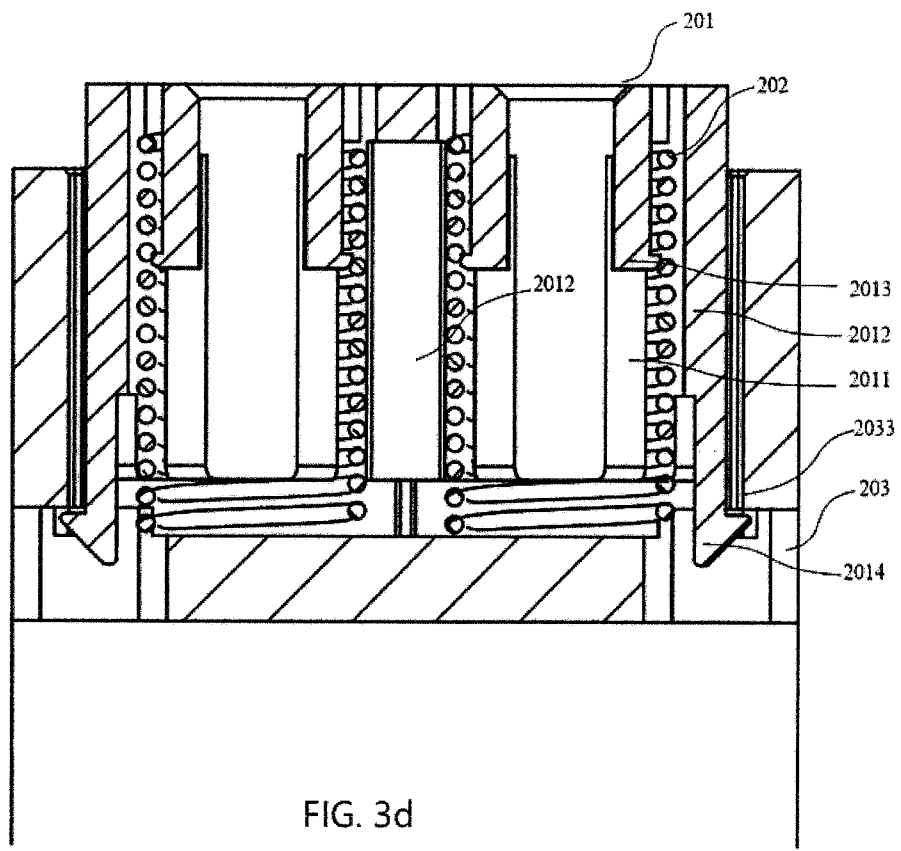

Particularly, the installing unit (201) shown in FIGS. 3 and 4 has two adjacent cylindrical structures, and the two adjacent cylindrical structures can share the adjacent outer cylindrical wall (2012). The installing assembly (2) according to the present embodiment further includes two springs (202) respectively connected to the inner and outer cylindrical walls of the two cylindrical structures, and a bracket (203) having a concave structure matching the outer wall profile of the installing unit (201).

Preferably, the inner wall of the concave structure of the bracket (203) according to the present disclosure also has a third clip structure (2033) corresponding to the second clip structure (2014) of the installing unit (201), so as to be interlocked with the second clip structure (2014).

Preferably, the inner wall of the elastic middle part (202) according to the present disclosure may also have a fourth clip structure corresponding to the first clip structure (2013) of the installing unit (201), so as to be interlocked with the first clip structure (2013).

During installing, the assembly (2) may be wholly assembled first and then installed onto the reflector (1), or the installing unit (201) and the elastic middle part (202) may be combined and installed onto the reflector (1), and then the combined whole is slid into the frame (203).

For example, the installing unit (201) may be first connected with the elastic middle part (202) by means of the first clip structure (2013) of the installing unit (201); then, the installing unit(201) is connected to the bracket (203) by using the second clip of the installing unit (201), followed by connecting the installing unit (201) to the antenna reflector (1).

Next, the assembled installing assembly (2) and the reflector (1) as a whole, is guided into a proper position in the closed frame (3) by a locating pin (2031) being on the installing assembly (2) and matching with the locating pin (301) of the frame (3), and the bracket (203) is attached to the frame (3) by means of the elastic force of the elastic middle part (202), being ready for subsequent blind and simultaneous insertion of a plurality of connectors.

Particularly, the step of connecting the installing unit (201) to the antenna reflector (1) may be performed before or after connecting the installing unit (201) with the elastic middle part (202), or may be performed before or after connecting the installing unit(201) with the bracket (202).

Particularly, those skilled in the art can determine the installing sequence according to actual conditions and requirements, without limitation to the examples in this specification.

Reference is made to FIGS. 5 and 6, in which FIGS. 5 and 6 illustrate an example of the completed state of the reflector (1), the plurality of installing assemblies (2) and the closed frame (3) by using the installing assembly according to the present disclosure.

FIG. 5a illustrates a schematic diagram of the back of the frame after the antenna is installed according to an embodiment of the present disclosure. Multiple connectors can be blindly and simultaneously inserted into the connector installing holes (302) of the closed frame (3) and the connector holes (2032) of the bracket (203). FIG. 5b illustrates a schematic diagram of a reflector after antenna installing is completed according to one embodiment of the present disclosure; FIG. 5b illustrates a schematic diagram of a three-dimensional structure of a reflector on the front face of an antenna according to an embodiment of the present disclosure; in which the installing unit is connected to the reflector via a threaded fastener. FIG. 6a shows a section of an antenna taken along a bracket axis of an antenna assembly according to an embodiment of the present disclosure, and FIG. 6b shows an enlarged view of the portion enclosed by circle in FIG. 6a.

According to the embodiments of the present disclosure, blind and simultaneous insertion of multiple connectors in a closed frame, especially in a closed frame with a large area can be realized, which improves the reliability of the active large-scale MIMO antenna and the efficiency of the installing process, reduce manpower as used, and increase the pass rate of installing. It can be easily adjusted by hand or by a tool due to the use of an elastic structure, and, it can be easily reworked since the installing assembly is easily disassembled, and, furthermore, the thickness and the weight of the antenna thickness can be reduced.

For a person skilled in the art, it is apparent that the present disclosure is not limited to the details of the above exemplary embodiments, and the present disclosure can be implemented in other specific forms without departing from the spirit or essential characteristics of the present disclosure. Therefore, the embodiments should be regarded as exemplarily and not restrictive, and the scope of the present disclosure is defined by the appended claims rather than the above description, and therefore it is intended that the claims All changes that come within the meaning and range of equivalency of the invention are encompassed by the invention. Any reference signs in the claims should not be regarded as limiting the involved claims. In addition, it is clear that the word "comprising" does not exclude other units or steps, and the singular does not exclude the plural. The multiple units or devices recited in the system claims may also be implemented by one unit or device through software or hardware. Words such as first, second, etc. are used to indicate a name and do not indicate any specific order.

The invention claimed is:

1. An installing unit for an antenna installing assembly, wherein said installing unit comprises
   a cylindrical structure including
      an inner cylindrical wall and
      an outer cylindrical wall,
   said inner cylindrical wall has a first clip structure for connecting a first other part between said inner cylindrical wall and said outer cylindrical wall, and
   said outer cylindrical wall has a second clip structure thereon for connecting said installing unit to a second other part, and
   said installing unit is configured for connection to a third other part via rigid connection.

2. Said installing unit according to claim 1, wherein said inner cylindrical wall has a threaded structure therein, and said installing unit is connected to said third other part through a threaded fastener.

3. Said installing unit according to claim 1, wherein said installing unit (201) comprises a plurality of cylindrical structures.

4. Said installing unit of claim 3, wherein said outer cylindrical wall is shared among said plurality of adjacent cylindrical structures.

5. An installing assembly of an antenna, wherein said installing assembly comprises
   the installing unit according to claim 1,
   an elastic middle part and
   a bracket with a concave structure at both ends thereof,
   said installing unit is connected to said elastic middle part between the inner cylindrical wall and the outer wall via said first clip structure; and
   said installing unit is connected to the inner wall of the concave structure of said bracket via said second clip structure on the outer wall thereof,
   the bottom of said elastic middle part is in contact with the bottom of the concave structure of said bracket, so that said installing unit is connected to a reflector of said antenna via rigid connection, and after placing said reflector and said installing assembly into a closed frame, said bracket is attached to said closed frame by means of the elastic force of said elastic middle part.

6. Said installing assembly according to claim 5, wherein the inner walls of the concave structures at both ends of said bracket respectively have a third clip structure matched with said second clip structure.

7. Said installing assembly according to claim 5, wherein said bracket comprises
   a locating structure for matching with a frame locating pin and
   a connector hole for a connector.

8. Said installing assembly according to claim 5, wherein if said installing unit comprises a plurality of cylindrical structures, said installing assembly comprises
   a plurality of elastic middle parts, and
   said installing unit is connected to said elastic middle part via a first clip structure on each inner cylindrical wall of each respective cylindrical structures, between each of said inner cylindrical wall and said outer cylindrical wall.

9. The installing assembly of claim 5, wherein said elastic middle part is a spring.

10. An installing assembly according to claim 5, wherein said closed frame includes a locating pin and a connector installing hole for guiding the locating of said bracket.

11. An installing method of an antenna, wherein the installing assembly of the antenna is as claimed in claim 5, wherein said installing method comprises the following:
   connecting the installing unit with the elastic middle part by using the first clip structure of the installing unit;
   connecting said installing unit with the bracket by using the second clip structure of said installing unit;
   wherein the bottom of said elastic middle part is in contact with the bottom of the concave structure of said bracket
   wherein said installing method further includes the following:
   attaching said installing unit to the reflector of the antenna.

12. The method according to claim 11, further comprising:
   placing said reflector and said installing assembly into the closed frame; and
   attaching said bracket to said closed frame by means of the elastic force of said elastic middle part.

* * * * *